United States Patent
Woodell et al.

(10) Patent No.: US 6,208,284 B1
(45) Date of Patent: Mar. 27, 2001

(54) RADAR AUGMENTED TCAS

(75) Inventors: Daniel L. Woodell, Robins; Gilbert M. Smoak, Cedar Rapids, both of IA (US)

(73) Assignee: Rockwell Science Center, Inc., Thousand Oaks, CA (US)

( * ) Notice: Subject to any disclaimer, the term of this patent is extended or adjusted under 35 U.S.C. 154(b) by 0 days.

(21) Appl. No.: 09/097,632

(22) Filed: Jun. 16, 1998

(51) Int. Cl.[7] .............................. G01S 3/02; G01S 13/86; G01S 13/93

(52) U.S. Cl. .............................. 342/30; 342/29; 342/455; 342/195; 342/42; 342/43; 342/46; 342/36; 342/176; 340/961; 701/301

(58) Field of Search ..................................... 340/945, 961, 340/963; 701/300, 301; 342/29, 30, 31, 32, 36, 37, 38, 39, 40, 41, 450, 454, 455, 195, 42–51, 175–186

(56) References Cited

U.S. PATENT DOCUMENTS

| | | | |
|---|---|---|---|
| 3,611,371 | * 10/1971 | Morse | 342/29 |
| 4,914,733 | * 4/1990 | Gralnick | 340/961 |
| 5,075,694 | * 12/1991 | Donnangelo et al. | 342/455 |
| 5,884,223 | * 3/1999 | Tognazzini | 701/301 |

* cited by examiner

*Primary Examiner*—Bernarr E. Gregory
(74) *Attorney, Agent, or Firm*—Nathan O. Jensen; Kyle Eppele; James P. O'Shaughnessy

(57) ABSTRACT

An improved traffic alert and collision avoidance method and device wherein TCAS data is augmented by higher resolution radar data. By using radar to search out targets, altitude information can be developed for those aircraft not equipped with altitude reporting transponders. The improved accuracy also allows angle/angle perspective display of air traffic and thus provides enhanced situational awareness.

10 Claims, 3 Drawing Sheets

RADAR AUGMENTED TCAS

BACKGROUND OF THE INVENTION

The present invention relates generally to a Traffic Alert and Collision Avoidance System (TCAS) and, more particularly, to an improved TCAS wherein target position is augmented by radar. In a further aspect of the invention, TCAS protection is provided to aircraft employing the present invention against all aircraft, independently of the type of transponsder a target aircraft is carrying, including target aircraft that do not have an operating transponder.

TCAS is a family of airborne devices that function independently of the ground based air traffic control system, and provide collision avoidance protection for a broad spectrum of aircraft types. The function of the TCAS is to present air traffic information, declare threats, and provide advisories on potential air traffic conflicts before the closest point of approach.

TCAS I provides proximity warning only, to assist the pilot in the visual acquisition of intruder aircraft. TCAS II provides traffic advisories as well as recommends escape maneuvers, or resolution advisories, for avoiding conflicting traffic. Resolution advisories are provided in the vertical direction only. Future enhancements to TCAS, which are still under development, are intended to provide traffic advisories and resolution advisories in both the horizontal and vertical directions.

The TCAS typically uses a Mode S transponder with which aircraft may be equipped to communicate collision avoidance decisions between aircraft. TCAS II, which is intended for large commercial and general aviation aircraft, tracks aircraft in proximity in both the horizontal and vertical planes, from which the time of closest approach may be predicted. The pilot of the interrogating aircraft is advised on how to avoid collision with a vertical resolution advisory, to climb, descend, do not climb, do not descend, and may also be advised as to a required vertical speed to avoid a collision. If the threat or intruder aircraft is also equipped with TCAS, the avoidance maneuver will be communicated and coordinated with the threat aircraft accordingly, so that both aircraft do not select the same avoidance maneuver.

Threat detection is performed at two levels. When air traffic approaches within a predetermined protective volume, a traffic advisory is provided to alert the pilot to attempt a visual siting and take whatever corrective action he or she deems appropriate to increase separation between the aircraft. If the two aircraft continue to approach, typically such that within a minimum of 20 seconds they will be within 0.1 nautical mile of each other with an altitude difference of not greater than 750 feet, a resolution advisory will be issued, displaying a vertical maneuver to the pilot to increase separation of the aircraft. The advisories may be accompanied by limits to the rate of climb or descent. TCAS equipment typically provide a graphical representation of the positions of the two aircraft and a numerical indicia of vertical separation. The graphical resolution advisory may be accompanied by an aural advisory, such as "descend, descend," etc.

One drawback of present systems is that the lack of bearing measurement accuracy precludes support of horizontal maneuvers. Another drawback of present systems is that the level of protection provided by TCAS depends on the type of transponder the target aircraft is carrying. TCAS provides no protection against aircraft that do not have an operating transponder.

Aircraft separation is central to the concept of "Free Flight." Improved technologies for ensuring separation are imperative for the transition of the National Airspace System from the current centralized command-and-control system between pilots and air traffic controllers to free flight, a distributed system that allows pilots, whenever practical, to choose their own route and file a flight plan that follows the most efficient and economical route.

It would, therefore, be desirable to provide an improved TCAS which is capable of providing sufficiently high accuracy to provide resolution advisories in both the vertical and horizontal directions for avoiding intruding aircraft. It would also be desirable to provide collision avoidance protection against all aircraft, even those that do not have an operating transponder.

SUMMARY OF THE INVENTION

It is, therefore, an object of the present invention to provide an improved traffic alert and collision avoidance method and device wherein TCAS data is augmented by higher resolution radar data. By using radar to search out targets, altitude information can be developed for those aircraft not equipped with altitude reporting transponders. The improved accuracy also allows angle/angle perspective display of air traffic and thus provides increased and improved situational awareness.

In a first aspect of the TCAS method and device according to the present invention, TCAS data is employed to search out targets (intruding aircraft). Radar is then used to search for those targets, adding higher resolution to the original TCAS data. Resolution is enhanced in the angular, distance, and velocity domains. The TCAS data stream is then modified with the higher resolution data.

In a second aspect of the present invention, there is provided a method and device for locating, tracking, and performing collision avoidance on noncooperative targets, such as aircraft with no working transponder (e.g., nontransponder equipped aircraft or aircraft without a working electrical system.

BRIEF DESCRIPTION OF THE DRAWINGS

The detailed description of the invention may be best understood when read in reference to the accompanying drawings wherein.

DETAILED DESCRIPTION OF THE INVENTION

Figure 1:
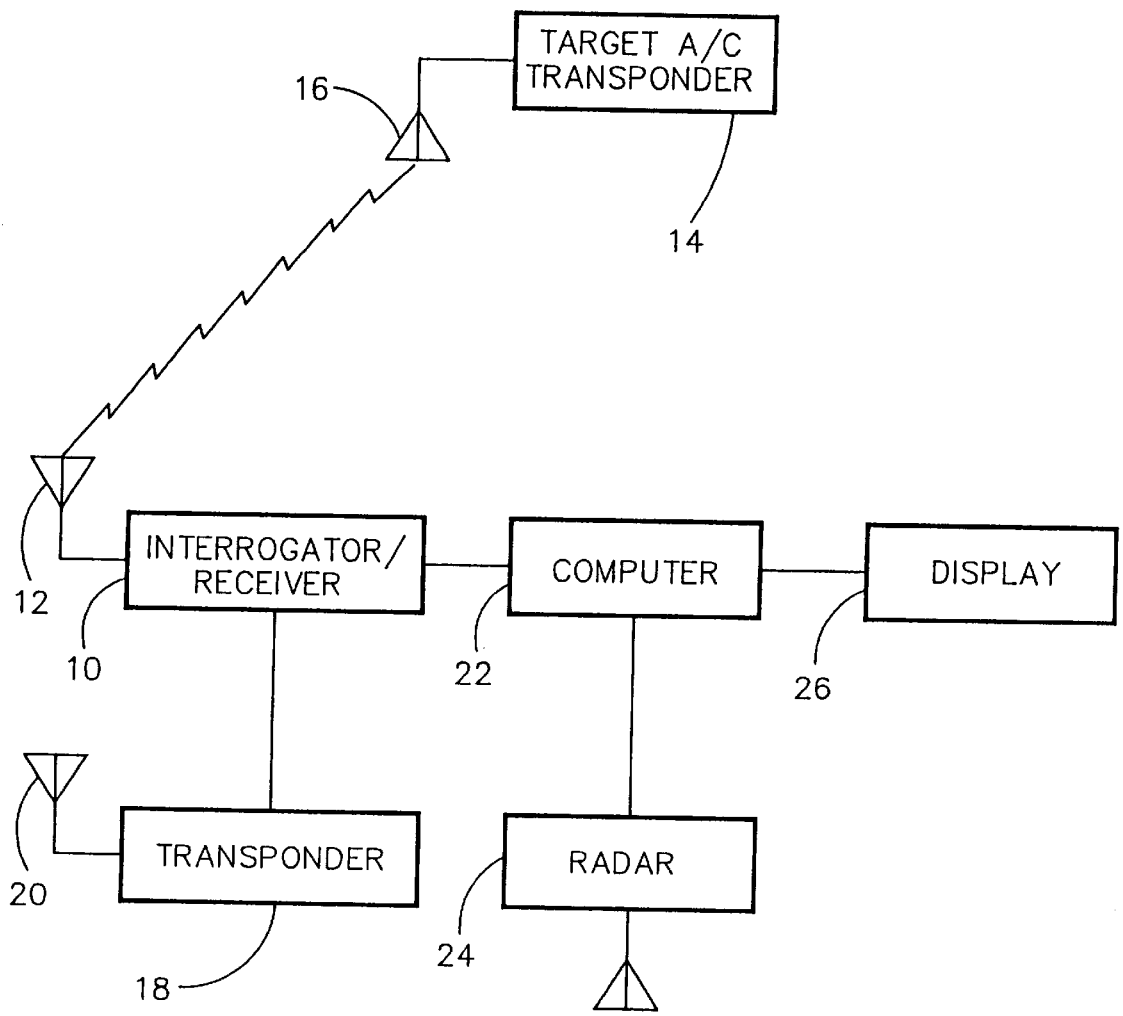
FIG. 1 shows a block diagram illustrating a first embodiment of the enhanced TCAS according to the present invention.

Referring now to FIG. 1, there is shown an exemplary TCAS according to the present invention. Interrogator/receiver 10, via antenna 12, interrogates transponders on other aircraft in the vicinity, represented by transponder 14 and corresponding antenna 16. The interrogating aircraft will typically also have its own transponder 18 and omnidirectional antenna 20 for communication and coordination with other aircrafts' interrogator/receivers (not shown). Antenna 12 will typically be a directional antenna to provide horizontal directivity, to allow interrogation of one sector at a time. Interrogator/receiver 10 may also employ the "whisper-shout" technique, which progressively varies the strength of interrogations to permit selective interrogation of different distances to target aircraft. Replies from target aircraft are fed to computer 22 which generates a traffic advisory and/or resolution advisory. Traffic advisories inform the pilot of nearby aircraft, along with distance, altitude, and approximate bearing information. Radar 24, e.g., weather radar, is then used to search out targets responding to interrogator/receiver 10 based on the initial TCAS data.

The enhanced distance, altitude, and bearing data for the target aircraft obtained by radar 24 is then used to modify the TCAS data stream, and the enhanced data is used to generate a traffic advisory and/or an enhanced resolution advisory which may be displayed on display 26. The displayed traffic advisory or resolution advisory may further be accompanied by an aural warning or aural instructions.

Figure 2:
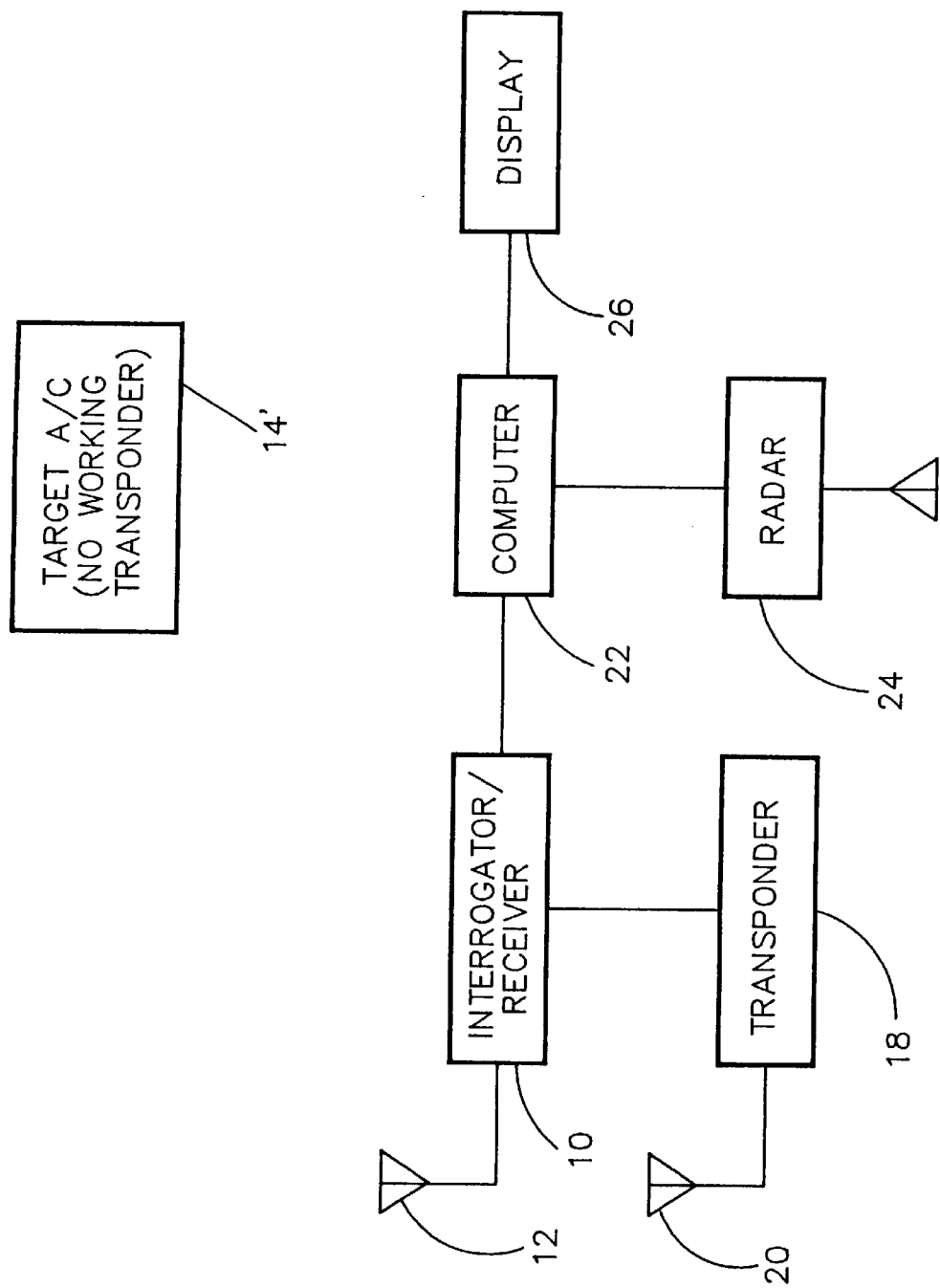
FIG. 2 shows a block diagram illustrating a second embodiment of the present invention.
Figures 3, 4:
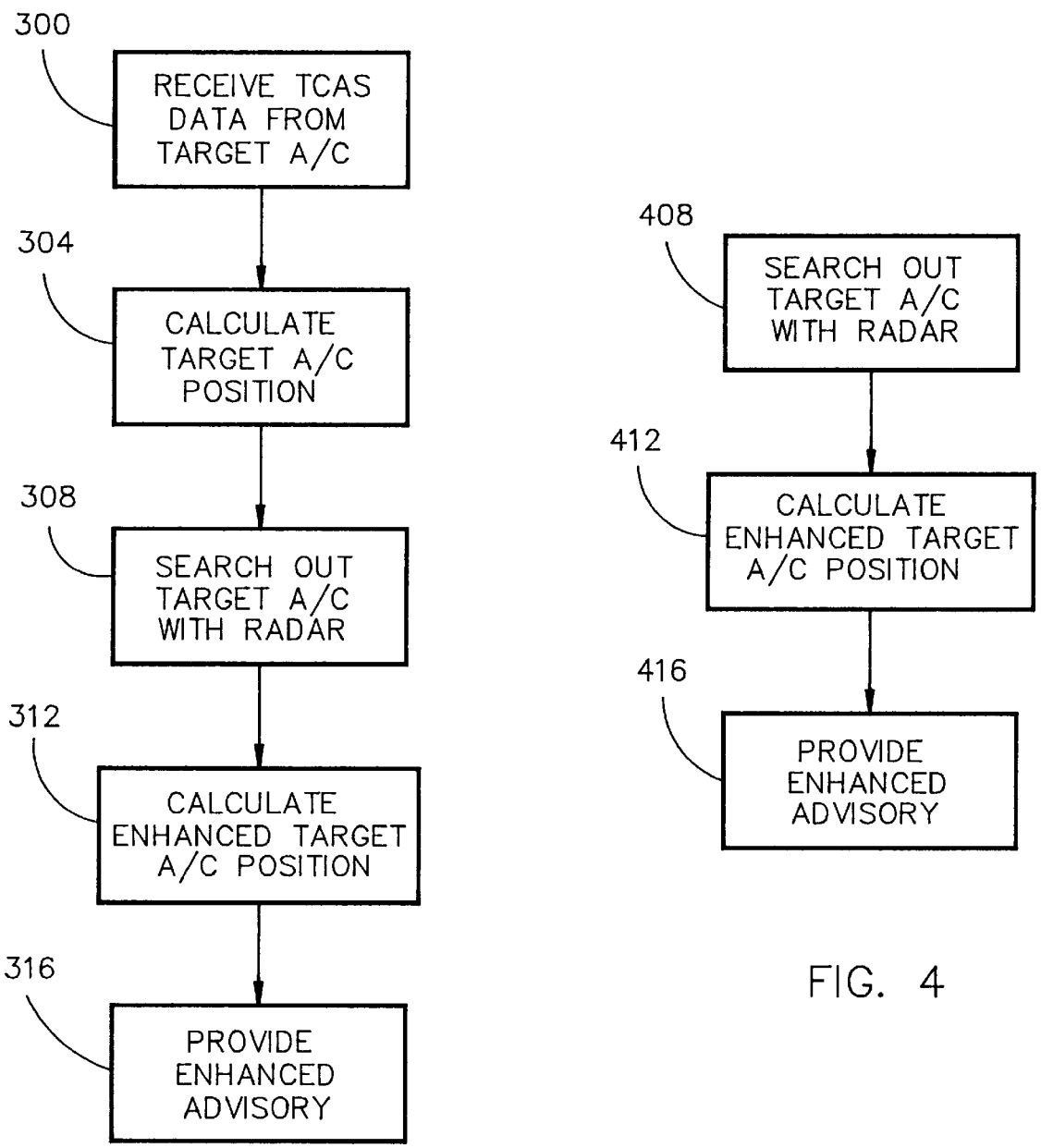
FIG. 3 is a flow chart outlining the basic method of operation of the collision avoidance system depicted in FIG. 1.
FIG. 4 is a flow chart outlining the basic method of operation of the collision avoidance system depicted in FIG. 2.

Referring now to FIG. 2, there is shown a block diagram depicting a second embodiment according to the present invention for performing collision avoidance on noncooperative aircraft 14'. By noncooperative aircraft is meant any aircraft without a working transponder. Radar 24 is employed to derive the position of target aircraft 14', e.g., based on radar returns from the fuselage aircraft 14'. The radar returns are filtered and converted to a TCAS data format providing range, relative bearing, and altitude information for the target aircraft. Referring now to FIG. 3, there is shown a flow chart illustrating the operation of the embodiment of the present invention depicted in FIG. 1. In step 300, TCAS data for a target aircraft is received and range, relative bearing, and altitude is determined in step 304. Optionally, a traffic advisory or a resolution advisory may be provided in step 304. The TCAS target position information is then used to focus or assist a radar search for the target aircraft in step 308. It will be recognized that the initial target position may be determined from alternate sources as well, including other traffic information products, such as ground based traffic information services, and the like.

The radar returns from step 308 are filtered and converted to TCAS compatible data format to provide enhanced position information in step 312. In step 316, the target aircraft is continued to be tracked and a traffic advisory and/or resolution advisory are be provided according to predetermined criteria, for example, when the aircraft equipped with the enhanced TCAS according to the present invention, or a given volume of airspace therearound, and the target aircraft, or a given volume of airspace therearound, approach to within a predetermined distance from each other, or, are predicted or estimated to come within a predetermined distance from each other within a predetermined period of time. Preferably, there are at least two threshold values, such as a first predetermined time or distance separation value which will trigger a traffic advisory and a second predetermined time or distance separation value which will trigger a resolution advisory. It will be recognized that the enhanced target position information provided by the present invention makes available other possibilities as well. For example, the TCAS according to the present invention may provide three separation thresholds, such as a first separation threshold wherein a traffic advisory is issued, a second separation threshold wherein a TCAS II type resolution advisory (vertical instructions only) is issued, and a third separation threshold wherein an enhanced resolution advisory suggesting evasive maneuvers in the both the vertical and horizontal directions may be issued.

Referring now to FIG. 4, there is shown a flow chart outlining the operation of the present invention wherein the target aircraft is not equipped with an operating transponder. In step 408, the target aircraft is initially detected and located by the radar system of the aircraft employing the collision avoidance system according to the present invention. The radar returns from step 408 are filtered and converted to TCAS compatible data format to provide enhanced position information in step 412. In step 416, the target aircraft is continued to be tracked and a traffic advisory and/or resolution advisory are be provided according to predetermined criteria as set forth in the above description of FIG. 3.

One of the advantages of the present invention is that altitude information can be generated for target aircraft not equipped with a working transponder. Another advantage of the present invention is that improved bearing information will allow generation of resolution advisories that provide suggested evasive maneuvers in both the lateral and vertical planes. Yet another advantage of the enhanced TCAS according to the present invention is that once radar has located the target aircraft, the location of the target aircraft may be continuously sampled and analyzed via a predictive recursive update technique, such as Kalman filtering, to provide enhanced target position estimation.

Display 26 (FIGS. 1 and 2) may be any display conventionally used to display TCAS information, and the present invention is not limited to any particular type of display format. Display 26 may also be used in conjunction with aural alerts. Display 26 may be, for example, a two-dimensional display such as an aircraft centered grid that displays nearby traffic symbology in relation to the aircraft. Such a two-dimensional display may incorporate the third dimension by using numerical indicia data tags next to the target aircraft indicia, or may use relative sizes, colors, and the like.

The TCAS data may also be incorporated into a primary flight display, flight director, or the like, and for resolution advisories, pilot cues such as a pointer on an altitude rate scale, or flight director steering cues, may likewise be provided. Advantageously, where conventional formats are employed in conjunction with the enhanced TCAS according to the present invention, the need for pilot retraining will be minimized.

The TCAS advisories may also be displayed on situational awareness displays, such as top view terrain maps or three dimensional perspective displays. In addition to current position, past position information may also be displayed and predictive techniques, such as Kalman filtering can be used to calculate future position, and circle of error probable of target aircraft. Resolution advisories may be displayed in terms of future flight path to be executed, or vertical and/or horizontal flight path components which are not to be exceeded, similar to localizer beam and glideslope parameters in an instrument landing system. Preferably, target aircraft position data and, optionally, past position history and expected future flight path based on trend information, may be displayed in a three-dimensional perspective display format. Since TCAS data is dynamic and continuously updated, and since TCAS is primarily designed to present information with which pilots then use to conduct a visual search of to locate potential threats by direct visualization, a pilot will be required to alternate between the head-down TCAS display and he head-up search for aircraft outside the cockpit, which may be difficult, particularly if a resolution advisory occurs during a period of high workload. Accordingly, display formats which provide a flightcrew with rapid and intuitive situational awareness, such as a three-dimensional display format, are most advantageously employed.

The description above should not be construed as limiting the scope of the invention, but as merely providing an illustration to some of the presently preferred embodiments of this invention. In light of the above description and examples, various other modifications and variations will now become apparent to those skilled in the art without departing from the spirit and scope of the present invention as defined by the appended claims. For example, the present invention may be utilized to as an enhancement for weather radar (OR) systems or airport surveillance radar systems. Accordingly, the scope of the invention should be determined solely by the appended claims and their legal equivalents.

What is claimed is:

1. A traffic alert and collision avoidance system (TCAS) for use in an aircraft, said traffic alert and collision avoidance system comprising:

a computer processing system for receiving target aircraft position data, determining target aircraft position, and generating a TCAS advisory;

an interrogator and receiver system connected to said computer processing system, said interrogator and receiver system for communicating with a transponder of target aircraft, said interrogator and receiver system for providing a first set of target aircraft position data to said computer processing system;

a radar system connected to said computer processing system, said radar system for searching for said target aircraft and for providing a second set of target aircraft position data to said computer processing system, said second set of data having a higher resolution than said first set of data; and a display connected to said computer processing system for displaying indicia representative of said target aircraft position, wherein said target aircraft position is determined using said second set of target aircraft position data.

2. The traffic alert and collision avoidance system according to claim 1, wherein said computer processing system comprises control logic for determining a change of flight path of said aircraft necessary to avoid a collision between said aircraft and, said target aircraft.

3. The traffic alert and collision avoidance system according to claim 2, wherein said change flight path consists of a vertical component only.

4. The traffic alert and collision avoidance system according to claim 2, wherein said change flight path consists of both a vertical and horizontal component.

5. The traffic alert and collision avoidance system according to claim 2, wherein said change flight path consists of a horizontal component only.

6. A method for detecting and avoiding collisions of an aircraft with target aircraft within a predetermined range of distances and altitudes, said target aircraft comprising an operable transponder, said method comprising the steps of:

sending an interrogation signal receivable by a transponder of the target aircraft;

receiving a signal from the transponder of the target aircraft;

calculating a first estimate of target aircraft position;

searching for said target aircraft using radar to provide radar returns indicative of the position of said target aircraft;

using said radar returns to calculate a second estimate of target aircraft position, said second estimate of target aircraft position having a higher resolution than said first estimate of target aircraft position; and displaying indicia representative of said target aircraft position, wherein said target aircraft position is determined using said second estimate of target aircraft position.

7. The method according to claim 6, further comprising the step of calculating a change of flight path of said aircraft necessary to avoid a collision between said aircraft and said target aircraft.

8. The method according to claim 7, wherein said change of flight path consists of a vertical component only.

9. The method according to claim 7, wherein said change of flight path consists of a vertical and horizontal component.

10. The method according to claim 7, wherein said change of flight path consists of a horizontal component only.

* * * * *